June 11, 1963

G. BURTON, JR., ETAL 3,093,726

ELECTRON BEAM WELDING APPARATUS

Filed Sept. 30, 1960

WITNESSES
Robert C. Baird
Leon M. Garman

INVENTORS
George Burton Jr, David Rosner
John G. Landkrohn and Richard L. Machett.
BY
Hymen Diamond
ATTORNEY

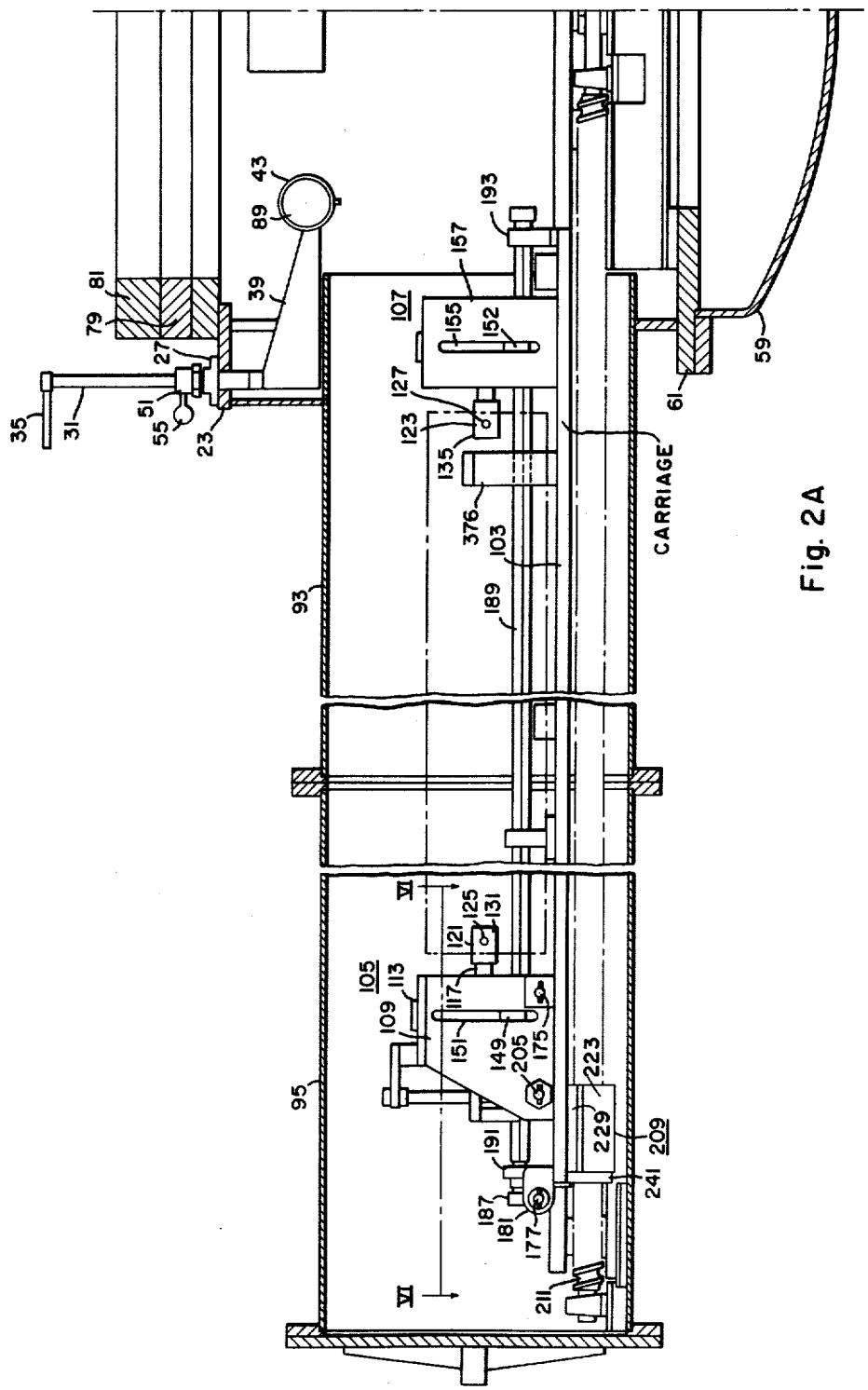

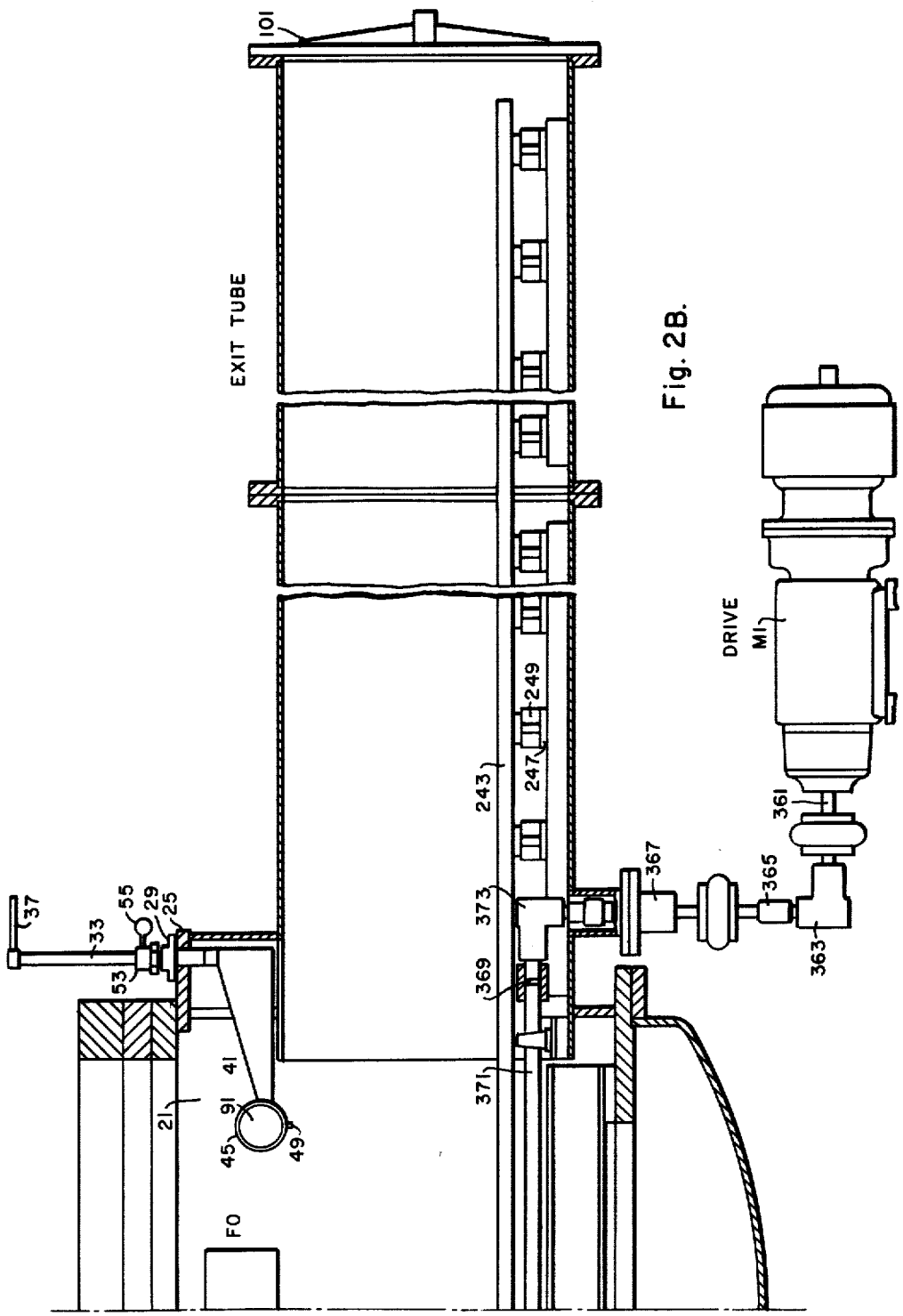

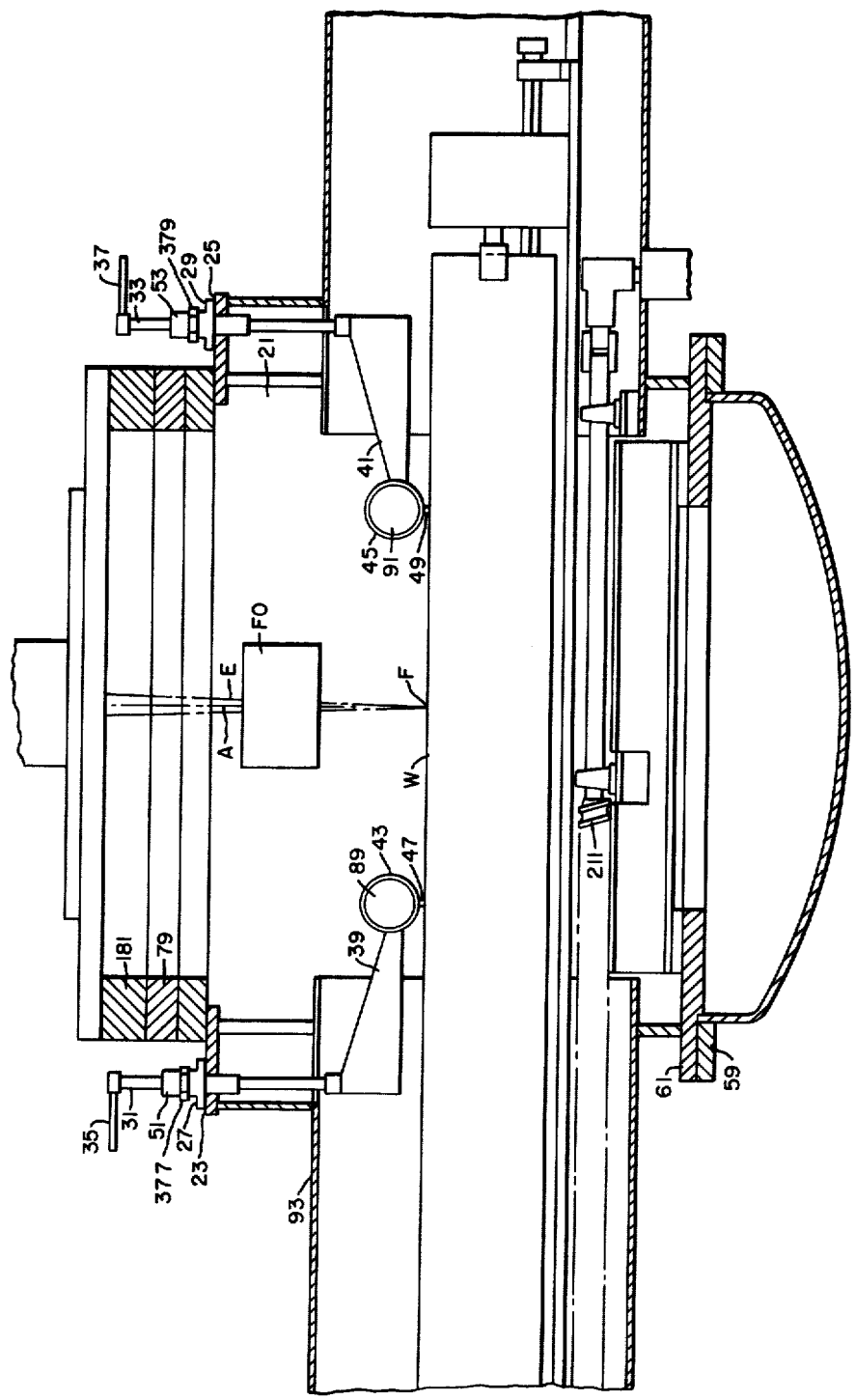

POSITIONING UNIT

United States Patent Office

3,093,726
ELECTRON BEAM WELDING APPARATUS

George Burton, Jr., Pittsburgh, David Rosner, McKeesport, John G. Landkrohn, Irwin, and Richard L. Machett, Pittsburgh, Pa., assignors to Westinghouse Electric Corporation, East Pittsburgh, Pa., a corporation of Pennsylvania
Filed Sept. 30, 1960, Ser. No. 59,723
11 Claims. (Cl. 219—117)

This invention relates to the materials joining art and has particular relationship to electron beam welding.

In electron beam welding the fusion is effected by a highly concentrated focused electron beam projected on the joint to be welded. In many situations in which electron beam welding is used it is desirable that a weld having a high depth-to-width ratio be produced. In such situations the accelerating voltage of the electron beam should preferably be of the order of between 50–150 kilovolts and the beam should be focused so that it has a relatively sharp focal point along its axis.

The principal object of this invention is to provide electron beam welding apparatus particularly for welding with a high concentrated electron beam for the purpose of producing a weld in which the ratio of depth to width is high.

Another object of this invention is to provide apparatus for producing an elongated welded joint having a high depth-to-width ratio.

This invention arises from the realization that in electron beam welding with a highly concentrated beam the joint to be welded should be precisely positioned at the focal point of the beam. It has in fact been found that displacement of the focal point along the axis of the beam by plus or minus ten-thousandths (.010) of an inch would deleteriously affect the weld. By using proper electromagnetic lenses, the beam could be focused so that its divergence at the focal point is small. In this case the position of the joint being welded along the beam is less critical. Another discovery from which this invention arises is that where the fused or heat affected region has a high depth-to-width ratio it is essential that the fused region extend precisely along a line perpendicular to the joint to be welded. Since the depth of the fused region is substantial any appreciable angular deviation of the electron beam would project the fused and heat affected zone in improper direction so that fusion would be produced in undesired regions or material enclosed in a welded container might be melted. This undesired condition would be particularly objectionable in situations in which the penetration of the weld is to be substantially 100 percent.

It is then a specific object of this invention to provide electron beam welding apparatus including facilities for setting the joint to be welded precisely with respect to the electron beam and angularly orienting the parts to be welded so that the fused and heat affected zone produced by the electron beam extends directly through the joint to be welded and is not displaced from this joint.

In accordance with this invention electron beam welding apparatus is provided which includes a work holding carriage having facilities for mounting the work. This carriage is movable from a work engaging position where the work is mounted to a work welding position where the work is subjected to the electron beam.

The carriage is slidably supported on rails which are aligned so that a joint to be welded on work mounted in the carriage is moved along a substantially straight line as the carriage is moved. The carriage is guided by the rail on only one side which is engaged by a bushing secured to the carriage. Cam follower rollers secured to the carriage engage the rail on the opposite side.

The carriage is advanced along the rails by a screw which is motor driven. The screw is engaged by a nut secured to the carriage, the nut advancing the carriage as the screw is rotated.

The electron beam welding apparatus is operated at a very low pressure less than .03 micron. In such a high vacuum lubricating greases are not readily usable in the moving parts. In accordance with this invention sliding surfaces are throughout replaced by rolling surfaces, greases and lubricating fluids are entirely dispensed with. The guide bushing and the rail is a ball bushing and the driving mechanisms for the carriage are actuated through a ball nut. These require no lubrication.

The joints to be welded are usually on opposite or adjacent faces of the works. For welding on one (the first) face the work may be aligned and levelled externally to the apparatus on rails coextensive and aligned with the carriage rails just described. The work is then moved into the welding chamber and the chamber evacuated.

In accordance with this invention, apparatus is provided including facilities for setting opposite or adjacent faces of the work for welding in the evacuated chamber. The apparatus is provided with gauges which are set to correspond to the first face of the work to be welded. In addition the apparatus according to this invention includes work positioning means which turns the work to any new face being welded and sets the new face with the aid of the gauges in the same position as the first face welded. The work positioning means includes mechanisms to be engaged with the work securing means for raising or lowering the work at each end separately along the axial direction of the electron beam and a mechanism for rotating the work about its axis so that any face of the work may be set for welding. When it is necessary to weld along a different face than the one initially set the work may be lowered with the raising and lowering mechanisms so that it may be freely turned. The work may then be turned and reset with the aid of the gauges.

The novel features considered characteristic of this invention are disclosed generally above. This invention both as to its organization and as to its method of operation together with additional objects and advantages thereof will be more clearly understood from the following description of a specific embodiment taken in connection with the accompanying drawings, in which:

FIGURE 1 is a view in perspective showing the overall structure of a preferred embodiment of this invention;

FIGS. 2A and 2B together constitute a view in longitudinal section of this embodiment, with the section taken substantially through the longitudinal center of the apparatus;

FIG. 3 is a view in longitudinal section of the Electron Beam Chamber and adjacent Entrance and Exit Tubes with the work in position to be welded;

The apparatus in accordance with this invention includes an Electron Beam Chamber in which the Work W is welded, an Entrance Tube through which the work W is advanced into the Chamber and an Exit Tube providing a space in which the leading end of the work W may extend when the following end is being welded. The apparatus also includes a Carriage (FIG. 2A) on which the work W is mounted and advanced into the Chamber, a Positioning Unit adjacent the Electron Beam Chamber for positioning the work and a Drive (FIG. 2B) for advancing the work.

Figure 1:
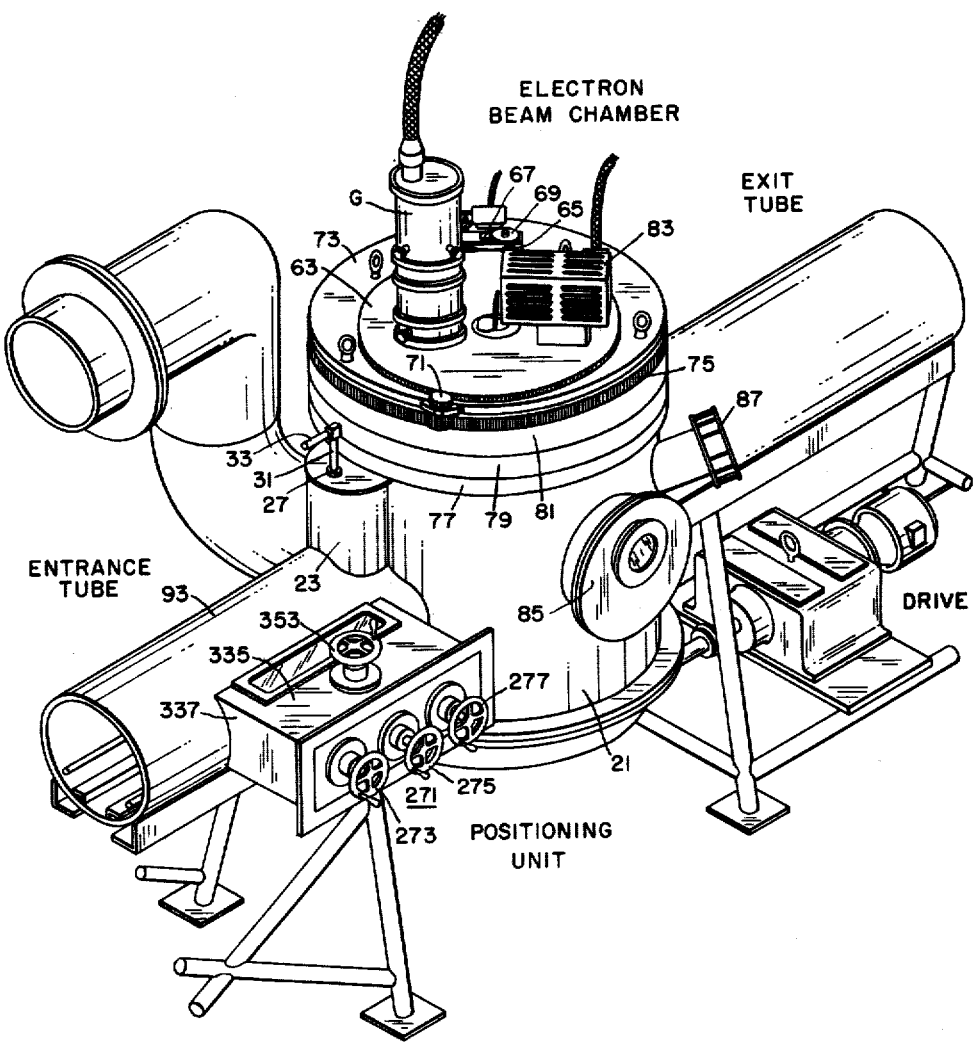

The Electron Beam Chamber includes a generally cylindrical flanged casing 21 having opposite openings in its side to which the Entrance Tube and the Exit Tube are joined. The joints should be gas tight and may be welded or soldered joints. Near the top the casing is provided with oppositely disposed ear chambers 23 and 25 which extend along the casing 21 and open into the Entrance and the Exit Tubes respectively. At the top each ear 23 and 25 is provided with a bearing 27 and 29 through which a pin 31 and 33 rotatable by a handle 35 and 37 extends. The bearing is provided with suitable O-rings (not shown) so that the joint between the bearing and the pin is gas tight. Each pin 31 and 33 carries a generally rectangular bracket 39 and 41 at its internal end on which a gauge 43 and 45 (FIGS. 2A and 2B) is supported. Each of the gauges 43 and 45 are suspended from its corresponding pin 31 and 33 with its gauging tip 47 and 49 positioned so that it may be engaged with the work W. Each of the gauges 43 and 45 may be swung in an arc along the work W by operation of the handle and may be positioned along the work so that a determination may be made of whether or not the work W is level. Each pin is provided with an adjustable collar 51 and 53. Once a gauge has been set on works W and the dial setting has been determined, the associated collar 51 and 53 may be secured by means of a thumb screw 55 and 57 in the position set. The gauge may then be raised from the work W. When the work is turned, the collar 51 or 53 and the dial reading permit the setting of the turned surface precisely in the same position as the prior surface set. The Electron Beam Chamber is provided with a hood 59 at the bottom which is sealed gas tight to the flange 61 of the casing 21. The electron beam gun assembly G (FIG. 1) which produces an electron beam E (FIG. 3) extends through the top of the casing 21. The beam E is focused electromagnetically by focusing apparatus F0 at a focal point F along its axis A.

The assembly G of the structure is generally disclosed in an application Serial No. 53,302 filed August 31, 1960 of Machett et al. for "Electron Beam Welding" and assigned to Westinghouse Electric Corporation.

The assembly G including the electron producing gun and the controlling grids and the focusing mechanisms is movable transversely to the direction in which the work is advanced. For this purpose the assembly G is mounted eccentrically in a gear 63 (FIG. 1) through which it projects into the casing 21. This gear 63 is driven from a motor (not shown) through a gear train 65, 67, 69 and drives a small gear 71 bushed on a movable ring 73 disposed below the gear 63. The gear 71 engages a fixed ring gear 75 and rotation of the gear 75 produces movement of the ring 73. The gear system is mounted on the upper flange 77 of the casing 21 through spacer rings 79 and 81. The gun G, the gear system and the movable plate 73 are sealed gas tight into the casing through the spacer rings 79 and 81. The rotatable large gear carries a television camera 83 by means of which the welding is viewed and properly positioned. The casing is provided with viewing ports 85 and 87 which may supplement the television camera 83. The gauge scales 89 and 91 may be viewed through the ports in leveling and positioning the work.

The gun assembly G is moved both by the gear 63 and by the ring 73 and its resultant motion is substantially linear and perpendicular to the longitudinal movement of the Carriage.

The Positioning Unit is capable of moving the work axially along the electron beam E and of rotating the work about its axis longitudinal with respect to the Carriage. The transverse or lateral positioning of the electron beam relative to the work is effected by moving the gun. An important feature of this invention is the facility for carrying out with the aid of the Positioning Unit the precise positioning of the work with reference to the focal point F of the electron beam E in a high vacuum which may be substantially less than .03 micron.

Figure 4:
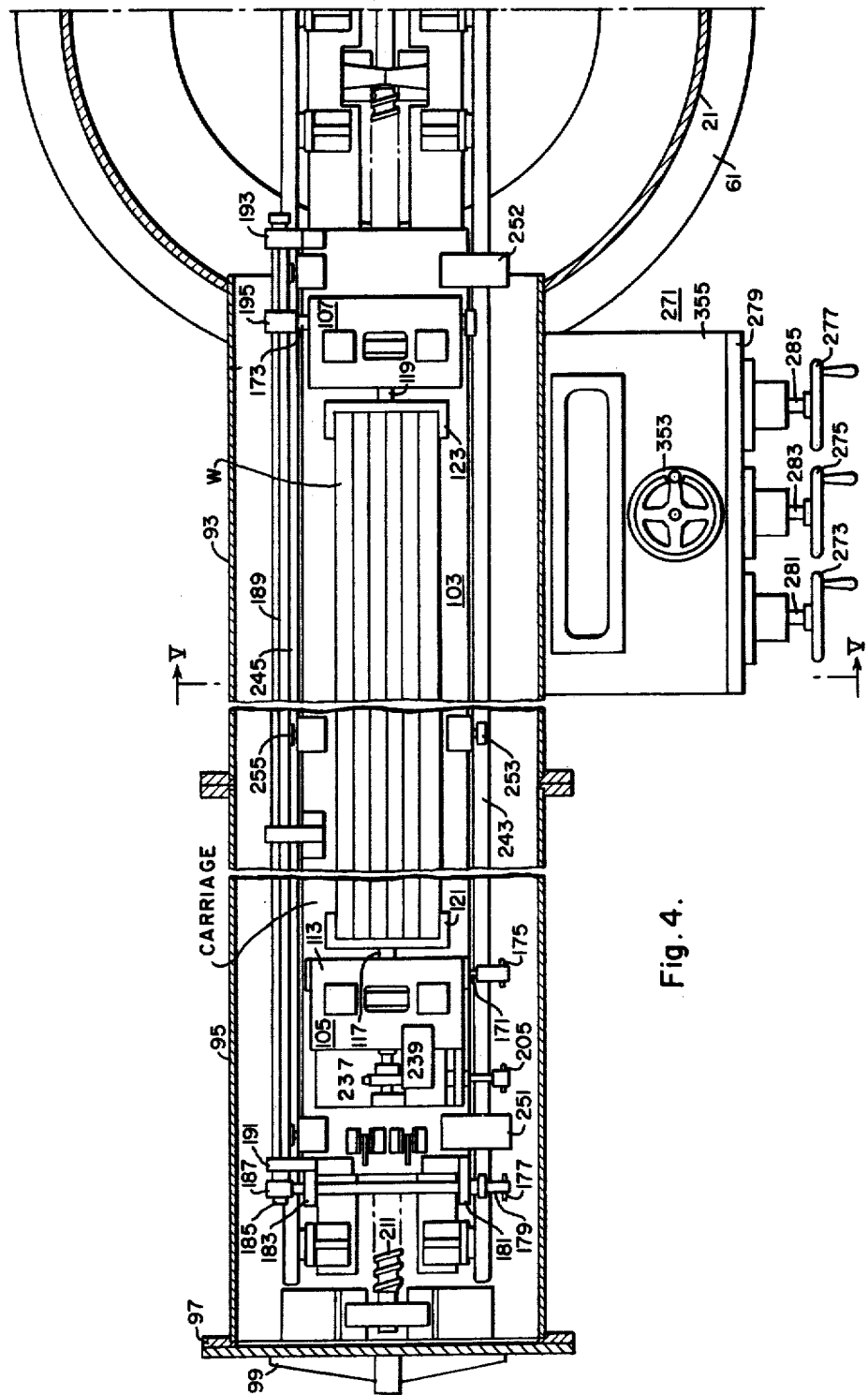
FIG. 4 is a view in longitudinal section showing the Entrance Tube, the Carriage and the Positioning Unit.

The Entrance Tube (FIG. 2A) is of generally cylindrical form except for the ear 23 extending from the Electron Beam Chamber and is made up of a plurality of flanged tubes 93 and 95 with the flanges in engagement and with adequate sealing rings (not shown) disposed at the joint. The Entrance Tube is provided with an end flange 97 to which a closure 99 may be sealed (FIG. 4). The Exit Tube is similar to the Entrance Tube and is provided with a like closure 101.

The Carriage includes a base plate 103 on which a pair of housings 105 and 107 are mounted. The plate 103 is provided with a plurality of holes (not shown) so that the housings 105 and 107 may be mounted in different longitudinal positions along the plate depending on the length of the work W to be welded. The housing 105 has side walls 109 and 111 a top 113 and a base 115, the base being bolted to the Carriage plate 103. The housing 107 is similarly constructed.

Figure 12:
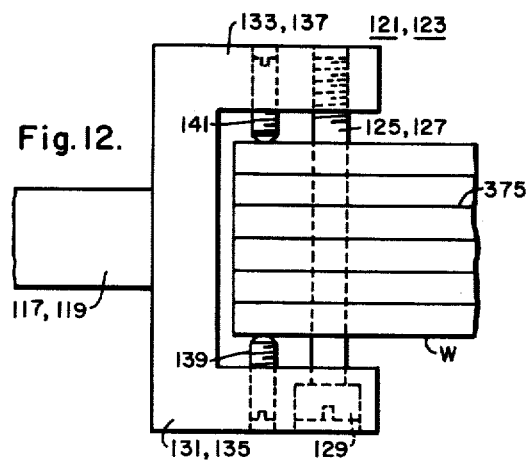
FIG. 12 is a view in top elevation of a work mounting yoke of the Carriage.
Figure 13:
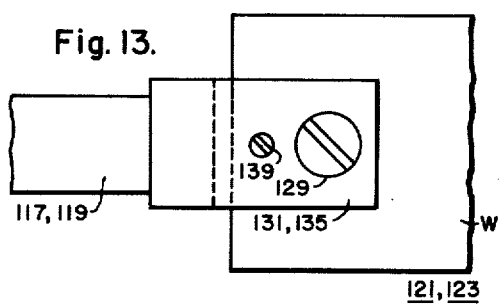
FIG. 13 is a view in side elevation of this yoke.

Each housing 105 and 107 includes a shaft or a pin 117 and 119 to which a work mounting yoke 121 and 123 is centrally secured. Each yoke 121, 123 (FIGS. 12, 13) is provided with a bolt 125, 127 that has a head 129 extending into one jaw 131, 133 of the yoke 121, 123 and a threaded end screwed into the other jaw 135, 137. The work W is provided with an opening at its ends through which the bolt 125, 127 in each of the yokes passes. The width of the work is appreciably less than the distance between the jaws 131, 133 and 135, 137 and the work W is centered and thereatfer secured by means of set screws 139, 141 extending through the jaws.

Figure 6:
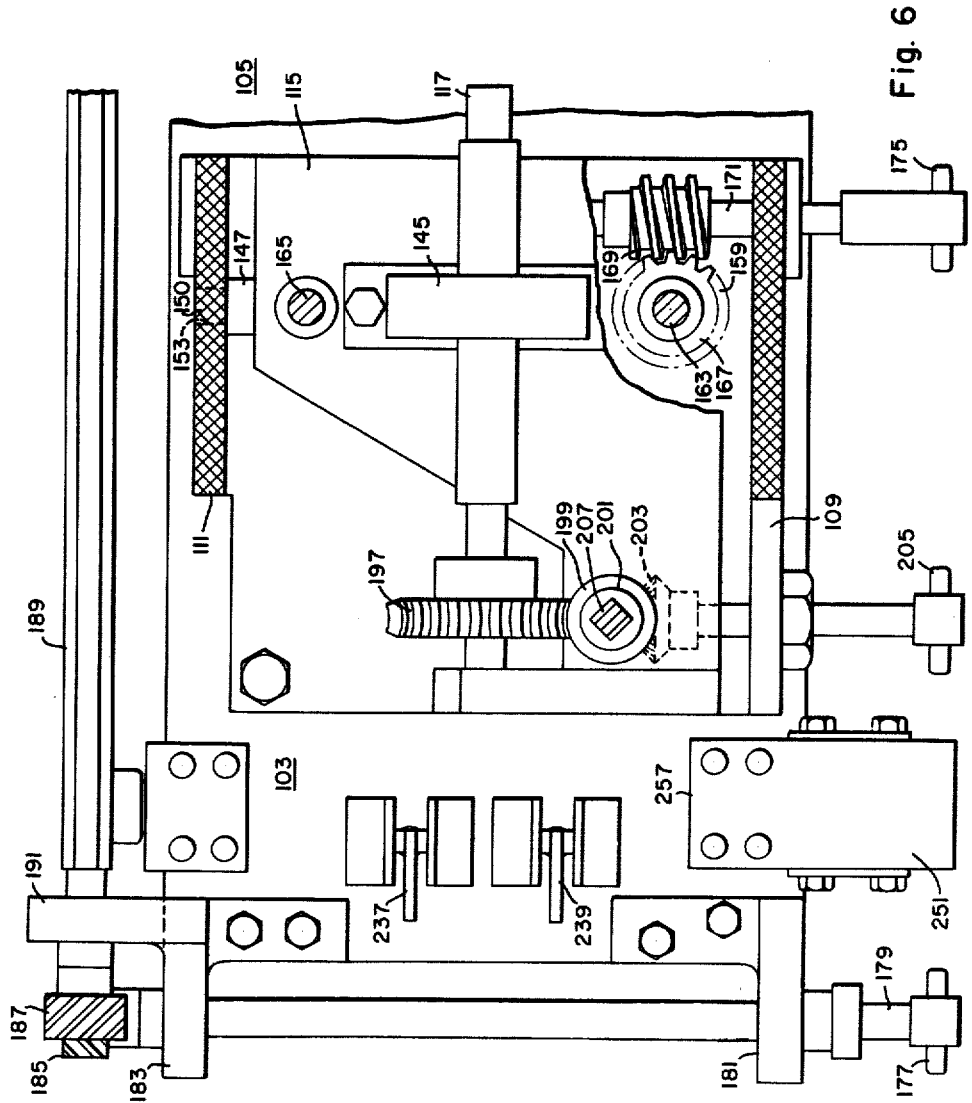
FIG. 6 is a view in section taken along line VI—VI of FIG. 2.

Each yoke supporting pin or shaft 121, 123 is supported in bearings in one or more pillow blocks 145 (for 105) (FIG. 6) which are mounted on plates 147 carrying at its ends guide pieces 149, 150, 152 which engage slots 151, 153 and 155 in the walls 109, 111 (for 105) and 157 (for 107) of the associated housings 105 and 107. The pillow block supporting plate 147 is provided with spaced nuts 159 and 161 which engage screws 163 and 165 extending between the top 113 and bottom 115 of each housing (shown only for 105). Each screw carries a worm gear 167 (only one shown FIG. 6) near its base which is driven by a worm 169 on a shaft 171 and 173 (each common for the screws 163 and 165 in each housing) bushed in the side walls 109 and 111, and 157 and the opposite wall (not shown) of the housings 105 and 107.

The shaft 171 of housing 105 is adapted to be driven directly from the Positioning Unit through a pin coupling 175. The shaft 173 is adapted to be driven from the Positioning Unit through a pin coupling 177. The coupling 177 is connected to a shaft 179 bushed in ears 181 and 183 extending from the base plate 103 of the Carriage and carries a worm 185. The worm 185 is in driving relationship with a worm gear 187. The gear 187 drives a shaft 189 of hexagonal section extending parallel to the base plate 103 of the Carriage and bushed in bushings 191 and 193 extending from the base plate. This shaft carries a worm 195 which through additional worms (not shown) drives the screws (not shown but similar to screws 163 and 165) in the leading housing 107 by means of which the pillow carrying plate 147 of that housing is moved upwardly and downwardly. The Carriage thus includes provisions for raising and lowering the work at each of the ends in the direction of the axis of the electron beam E.

The work W is turned by a worm gear 197 on a shaft 117. This gear 197 is driven by a worm 199 coupled through level gears 201 and 203 to a pin coupling 205 adapted to be driven from the Positioning Units. The worm 199 is on a rectangular shaft 207 permitting the worm 199, gear 197 to move up and down with the pillow block 145.

Figure 9:
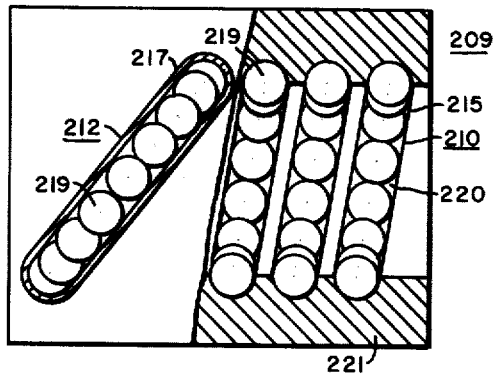
FIG. 9 is a view partly in section and partly in side elevation of the ball nut used in advancing the Carriage in the apparatus shown in FIG. 1.

A ball nut 209 (FIG. 2A) adapted to be engaged in driving relationship by a driving screw 211 of the Drive is removably secured to one end of the Carriage plate. The ball nut 209 is shown in FIG. 9 and includes a plurality of sets 210, 212 of tubular ball elements each having a plurality of communicating spiral turns 215 and a return tube 217 from the end of the last turn 215 to the beginning of the first turn. The inner surfaces of the spiral turns 215 of each tubular element 210, 212 are ground away to uncover the balls 219. These tubular elements 210, 212 are inserted in grooves 220 of a cylindrical casing 221 with the balls 219 available as bearing surfaces. The cylindrical casing 221 is mounted in a rectangular enclosure 223 having ribs 225 for securing to the base plate 103. The pitch and lead of the turns 215 correspond to the pitch and lead of the screw 211.

Figure 5:
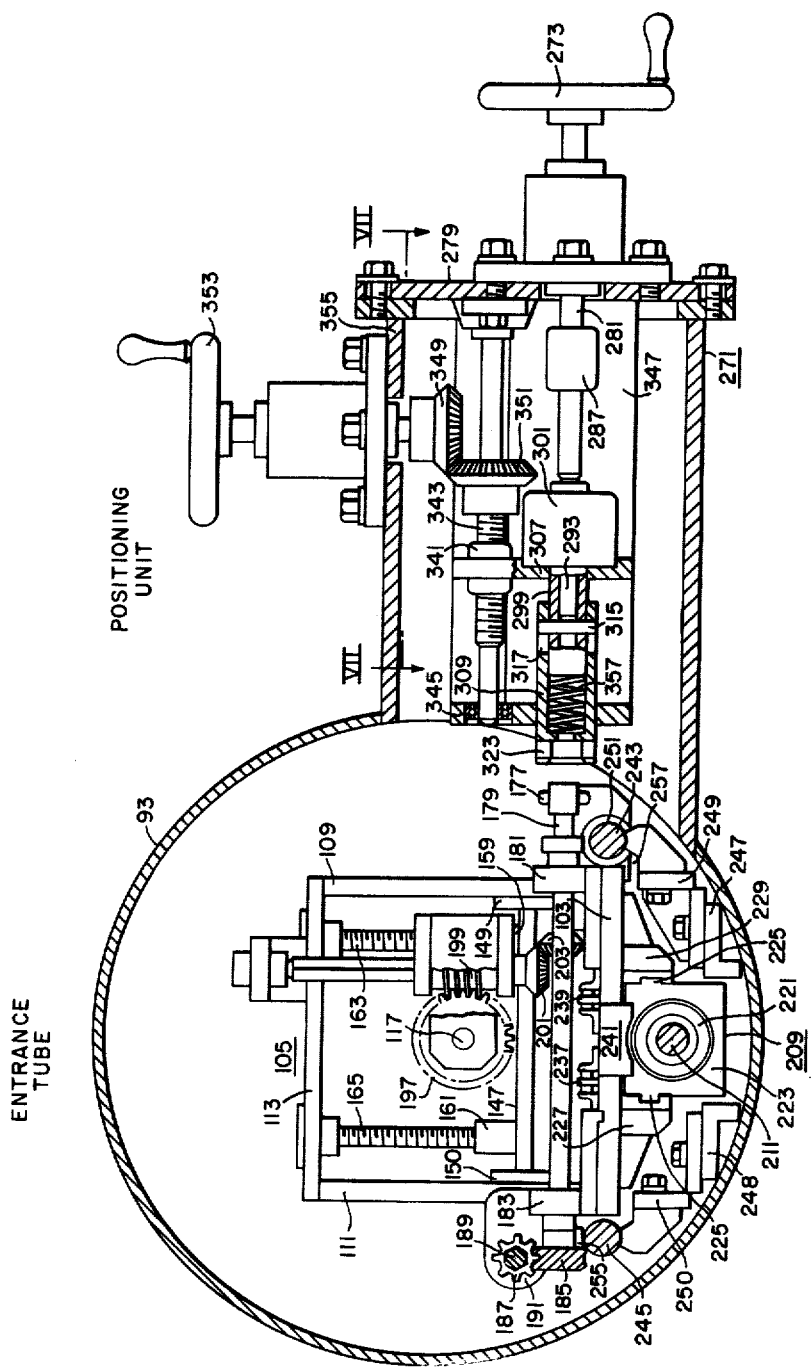
FIG. 5 is a view in section taken along line V—V of FIG. 4.
Figure 11:
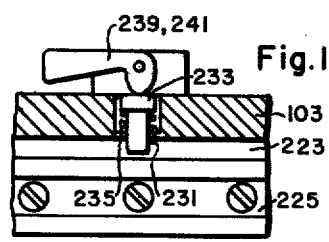
FIG. 11 is a view in section of the locking mechanism for the ball nut.

The enclosure 223 is held in grooved plates 227 and 229 (FIG. 5) extending downwardly from the lower face of the base 103, the grooves being engaged by the ribs 225. The ball nut enclosure 223 is provided on each side with openings 231 (FIG. 11) (only one shown) which are adapted to register with pins 233 (only one shown) extending through the Carriage base 103 and in the unengaged position held retracted by suitable springs 235 (only one shown). Each of the pins 233 is adapted to be moved into the registering opening 231 in the ball nut enclosure 223 against the force of the spring by action of a locking cam 237 and 239 which may be pivoted by hand from a locking to an unlocking position. So that the registering holes 231 may be properly set to be engaged by the pins, the end of the Carriage base 103 is provided with an overhanging stop plate 241 that engages the end face of the ball nut enclosure 223 when the ball nut is being attached to the Carriage. With the end of the ball nut, enclosure 223 engaging the stop plate 241 the pins 233 register with the openings 231 in the end plate.

The facility for disengaging the ball nut 209 from the Carriage permits the Carriage to be moved outwardly from the Entrance Tube so that the work W may be mounted on the yokes 121, 123 and completed work may be removed from the yokes.

The Carriage is suported on rails 243 and 245 (FIG. 5) extending on each side of the Entrance Tube, Electron Beam Chamber and Exit Tube substantially along the whole length of these Tubes and the Chamber. The rails 243 and 245 are supported on angles 247 and 248 extending axially along the Tubes and the Electron Beam Chamber by angles 249 and 250 supported by these axial angles. To provide for the distortion produced in the fabrication of the Tubes and the Chamber, the rails 243 and 245 are mounted adjustably and the adjustments are set so that the rails are substantially horizontal, straight and parallel.

The Carriage is supported from the rails 243 by ball bushings 251, 252. The carriage is also supported both from rail 243 and rail 245 by cam follower rollers 253 and 255 which are spaced along the Carriage on both sides. The ball bushings 251 and 252 are secured to brackets 257 suspended from the base plate 103 of the Carriage and align the Carriage along the rail. The cam follower rollers 253 and 255 help support the Carriage and permit slight relative displacement.

Figure 10:
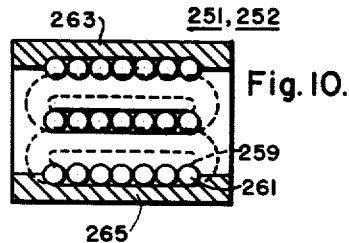
FIG. 10 is a view in section of the ball bushing used in supporting the Carriage in this apparatus.

Each ball bushing (shown in FIG. 10) includes a plurality of oval tubular elements 259 within which the balls 261 are disposed. The portion of each tubular element 259 which is to serve as the bearing surface is ground away to uncover the balls 261. The other portion remains covered. Each of these ball elements is inserted in a slot 263 in the bushing casing 265 with the balls 261 exposed serving as the bearing surface of the bushing.

The Positioning Unit (FIGS. 1, 5, 7, 8) is enclosed in a housing 271 sealed to the Entrance Tube near the Electron Beam Chamber. A plurality of hand wheels 273, 275, and 277 extend through the front face 279 of the housing 271, each carrying a shaft or pin 281, 283, 285 which is rotatable by rotation of a corresponding hand wheel. Each shaft 281, 283, 285 is connected through a coupling 287, 289, 291 to a stud 293, 297 (one not shown) of rectangular or square section. Each rectangular stud 293, 297 engages a rectangular opening in a hollow stud shaft 299, 300 (other not shown) which is rotatable in a bearing 301, 303, 305 supported in a movable plate 307. Rotation of a hand wheel 273, 275, 277 rotates the associated hollow shaft 299, 301 on its bearing 301, 303, 305 through the rectangular stud 293, 297. Each hollow shaft 299, 301 is coupled to a female coupling element 309, 311, 313 by means of a pin 315, 317 (other not shown) which engages a slot 319, 321 (other not shown) in the coupling element. Each coupling element 309, 311, 313 has a groove 323, 325, 327 (FIG. 5) at its outer end, each groove being adapted to engage the pin 175, 205, 177 respectively in the end of the shafts in the Carriage which drive the positioning gearing for the work W.

Figure 7:
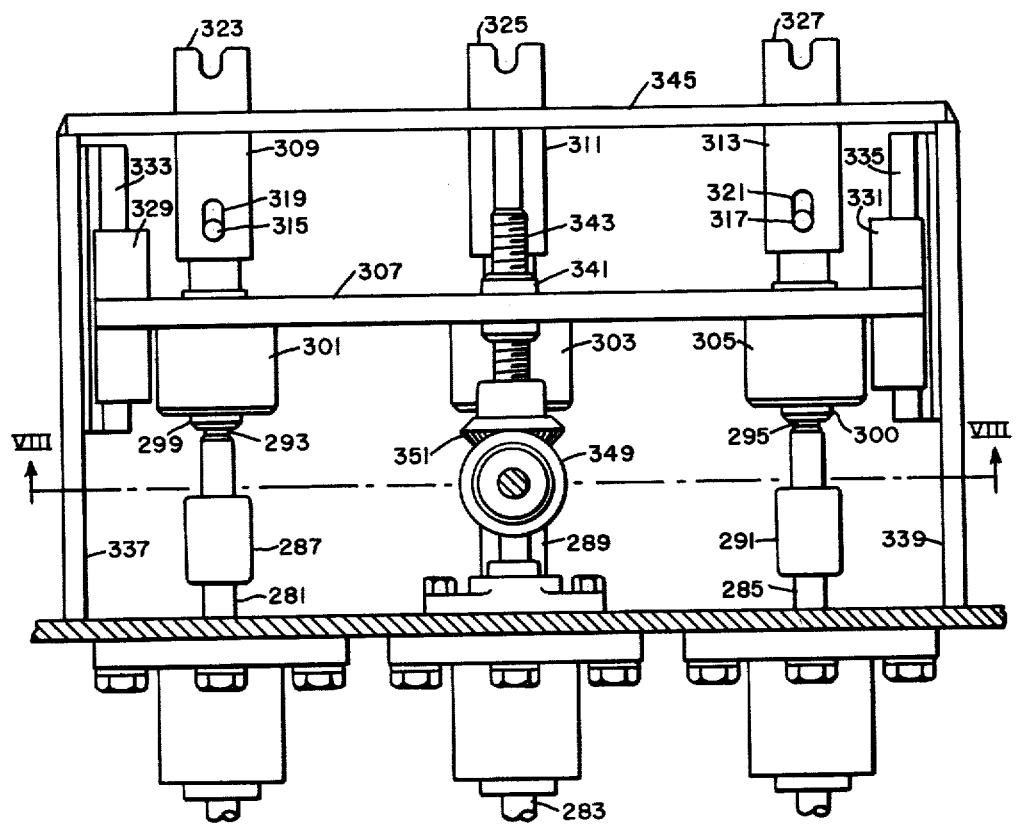
FIG. 7 is a view in section taken along line VII—VII of FIG. 5.
Figure 8:
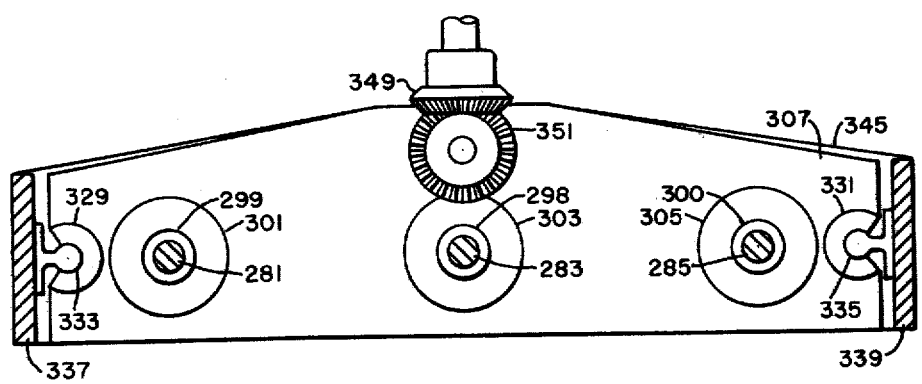
FIG. 8 is a view in section taken along line VIII—VIII of FIG. 7.

The bearing plate 307 is provided with ball bushings 329 and 331 at its ends. The ball bushings 329 and 331 are slidable on ways 333 and 335 secured to the side walls 337 and 339 of the housing 271 (FIGS. 7, 8). Each of the ball bushings has the form shown in FIG. 10.

In its upper portion the plate 307 supports a nut 341 (FIGS. 5, 7) which engages a screw 343 bushed in the face 279 of the housing and in a plate 345 extending at right angles from a plate 347. This screw is rotatable through beveled gears 349 and 351 by a hand wheel 353 extending through the top 355 of the housing 271. Rotation of the hand wheel 353 extending from the top 355 of the housing 271 causes the plate 307 carrying the bearings for the hollow shafts 299, 300 to be moved inwardly or outwardly.

Preferably, the assembly including the hand wheels 273, 275, 277 extending from the face plate 279, the slidable plate 307 and the screw 343 by means of which it is moved are mounted as a unit on the face plate 279 and on the bracket 345–347 and are removable as a unit, from the enclosure 271.

In the use of the Positioning Unit each female coupling element 309, 311, 313 engages an associated coupling pin 175, 205, 177 on one or the other of the positioning shafts of the Carriage. This engagement is effected with the Carriage moved so that the work is in welding relationship with the beam E. In this position the coupling pins 175, 205, 177 are opposite the coupling elements 309, 311, 373 and may be engaged. The Carriage base 103 may be provided with markings to indicate that the coupling pins are in coupling position.

With the Carriage set so that the coupling pins 175, 205, 177 may be coupled the hand wheel 353 extending from the top 353 of the housing 271 is rotated in a direction such that the plate carrying the bearings is advanced towards the coupling pins 175, 205, 177. This in turn advances the coupling elements 309, 311, 313 so that at their ends they engage the coupling pins 175, 205, 177. Usually the coupling elements are oriented so that a coupling pin engages the outer edge of an element rather than entering a slot 323, 325, 327 in the element. For such contingency each coupling element includes a spring 357 (others not shown) which is compressed permitting the advance of the coupling elements. To set a coupling pin 175, 205, 177 into a coupling slot 323, 325, 327 the associated hand wheel 273, 275, 277 is rotated; the associated spring 357 then permits the coupling slot to engage with the pin.

The Drive includes the screw 211 which is mounted on suitable bearing supports 309 disposed in the Entrance Tube and in the Electron Beam Chamber. The screw 211 is engaged in driving relationship with the ball nut 209. The screw is of sufficient length to permit the Carriage to be advanced over the distance over which the welding is to be carried out.

The Drive also includes a gear motor M1 (FIG. 2B) which may be of the alternating current type. The motor shaft 361 operates thru an angle speed reducer 363 to drive an intermediate shaft 365 at reduced speed. This shaft 365 passes into the evacuated space through a rotating vacuum seal coupling 367 and is connected to a coupling 369 on an extension 371 of the screw 211 through a second angle gear reducer 373 which increases the speed of the drive to that desired. The speed of the screw 211 is preferably the same as the speed produced by the output shaft 361 of the gear motor M1. The drive operates at a reduced speed only in the vacuum seal coupling 367 where a high speed would reduce the life of the coupling.

Preparatory to the use of the apparatus the ball nut 209 is disengaged from the Carriage and the Carriage is moved outwardly and held on a suitable table or cart (not shown). In this position, the work is mounted between the yokes 121, 123.

This table is provided with rails (not shown) which are spaced and aligned and of the same dimensions as the rails 243 and 245 in the Entrance and Exit Tubes and the Chamber. The rails on the table are lined up with the rails in the apparatus housing so that the movement of the Carriage is essentially unaffected as it passes from one set of rails to the other. To a large extent the work W may now be lined up on the Carriage by setting the distance from the joints 375 to be welded initially to the base of the Carriage at a predetermined magnitude. The work W may be leveled on the table with the usual leveling mechanisms. For focusing the electron beam E a tungsten block 376 is mounted on base 103 with its surface coextensive with the surface to be welded (FIG. 2A).

It is desirable that the work be lined up so that when it is moved into the Electron Beam Chamber the joint to be welded is within the region in which the electron beam E is to be focused. The distance between the joint to be welded and the base of the Carriage should be set to correspond to this distance from the gun. Once the work is properly mounted on the Carriage, the Carriage is moved into rails 243 and 245 and the ball nut 209 is secured to the Carriage. The Carriage is now moved inwardly until the work is about in the center of the Electron Beam Chamber. The gauges 43 and 45 are then engaged with the work and set so that each gauge dial 89 and 91 has a predetermined reading. The sleeves 51 and 53 on the gauge pins are then locked so that in the position of the reading these sleeves engage the nuts 377 and 379. The gauges may then be raised. The sleeves 51 and 53 remain in the positions in which they are set and any return of the gauges to the surface of the work should produce the predetermined reading when the sleeves 51 and 53 engage the nuts 377 and 379.

After the gauges 43 and 45 have been set the Electron Beam Chamber is evacuated. The Electron Beam is focused on the tungsten target 376 after the evacuation has been completed. During the focusing the desired electron beam parameters, the voltage of the electron beam E and the beam current are set. The beam E is now turned off and the work is moved so that the leading end of the joint 375 is under the focal point F of the electron beam E. The electron beam is now again turned on and the welding is carried out. When one joint 375 has been welded the Electron Beam may be moved to another joint on the same face of the work W by means of the gear mechanism 63–75 on the top of the Electron Beam Chamber. To weld the joints in other faces of the work W, the work is first lowered by rotative shafts 171 and 179 with wheels 277 and 273 so that it will not contact the focusing apparatus F0 and is then turned by rotating wheel 275. The Chamber remains evacuated.

After the work W is rotated so that the face to be welded is horizontal, the gauges 43 and 45 are engaged with this face and the face is set by operating wheels 273, 275, and 277 so that the gauge dials 91 and 93 have the same readings as for the initially welded face with the collars 51 and 53 engaging the nuts 377 and 379. The gauge feelers 47 and 49 may be swung over the surface of the work W to assure that the work is level.

After the work W has been completed it may be removed from the apparatus with the aid of the table and the next unit of work may be mounted as just described. If this latter unit is similar to the first unit of work it may be set with the aid of the gauges 43 and 45 the settings of which had already been determined for the first unit of work. In this event, the Positioning Unit may be used to line up the new unit of work to correspond to the gauge readings.

While a preferred embodied of this invention has been disclosed herein many modifications thereof are feasible. This invention then is not to be restricted except insofar as is necessitated by the spirit of the prior art.

We claim as our invention:

1. Electron beam welding apparatus for welding work over a substantial length in a predetermined direction comprising means for producing a concentrated electron beam having a focal point along its axis, work holding means for holding said work, said work holding means including work mounting means for mounting said work at at least two regions of said work spaced along said direction, and work positioning means adjacent said beam for positioning said work relative to said focal point and including first means for engaging said holding means to move said mounting means so that one of said regions moves along said axis, second means for engaging said holding means to move said mounting means so that said other of said regions moves along said axis, and third means for rotating said work about the line between said regions.

2. Electron beam welding apparatus for welding work over a substantial length extending in a predetermined direction comprising means for producing a concentrated electron beam having a focal point along its axis, a work holding carriage having at least two work mounting means for mounting said work, means connected to said carriage for moving said carriage from a work engaging position remote from said beam where said work is mounted in said mounting means to a welding position where said work is in welding relationship with said beam, first means adjacent said beam for engaging said carriage to move one of said work mounting means in the direction of said axis to position said work in said welding position, second means adjacent said beam for engaging said carriage to move said other work mounting means in the direction of said axis to position said work in said welding position, and third means adjacent said beam for engaging said carriage to rotate said mounting means about an axis along said direction to position said work in said welding position.

3. Electron beam welding apparatus for welding work over a substantial length extending in a predetermined direction comprising means for producing a concentrated electron beam having a focal point along its axis, a work holding carriage having at least two work mounting means for mounting said work, a screw, a ball nut connected to said carriage and engaging said screw, means connected to said screw for rotating said screw for moving said carriage through said ball nut from a work engaging position remote from said beam where said work is mounted in said mounting means to a welding position where said work is in welding relationship with said beam, first means adjacent said beam for engaging said carriage to move one of said work mounting means in the direction of said axis to position said work in said welding position, second means adjacent said beam for engaging said carriage to move said other work mounting means in the direction of said axis to position said work in said welding position, and third means adjacent said beam for engaging said carriage to rotate said mounting means about an axis along said direction to position said work in said welding position.

4. Electron beam welding apparatus including means for producing a concentrated electron beam having a focal point, a work holding carriage, supporting means for said carriage including a first rail and a second rail substantially parallel to said first rail, ball-bushing means secured to said carriage and in sliding engagement with said first rail, roller means secured to said carriage and in rolling engagement with said second rail, and means connected to said carriage for moving said carriage along said rails on said bushing means and said rollers as bearings.

5. Electron beam welding apparatus for welding work comprising a chamber, means connected to said chamber for producing a concentrated electron beam having a focal point in said chamber, work-holding means for holding said work, means connected to said work-holding means and in communication with said chamber for moving said holding means from a work-engaging position external to said chamber where said work is engaged with said holding means in a setting to be welded to a welding position in which said work is in welding relationship with said beam, and means adjacent to said beam and including work-positioning means and means for connecting said positioning means to said holding means when said holding means is in said welding position for positioning said work relative to said focal point in welding relationship with said beam.

6. Electron beam welding apparatus for welding work over a substantial length extending in a predetermined direction comprising a welding chamber, means for producing a concentrated electron beam having a focal point along its axis in said chamber, a work holding carriage having at least two work-mounting means for mounting said work, a screw, a ball nut connected to said carriage and engaging said screw, means connected to said screw for rotating said screw for moving said carriage through said ball nut, said screw extending beyond said chamber so that said carriage is movable in said direction from a work engaging position external to said chamber, where said work is mounted in said mounting means in a setting to be welded, to a welding position where said work is in welding relationship with said beam, and means adjacent said beam for engaging said carriage to position said work relative to said focal point when said work is in said welding position.

7. Electron beam welding apparatus for welding work over a substantial length extending in a predetermined direction comprising a welding chamber, means for producing a concentrated electron beam having a focal point along its axis in said chamber, a work-holding carriage having at least two work mounting means for mounting said work, a screw, a ball nut connected to said carriage and engaging said screw, and means connected to said screw for rotating said screw for moving said carriage, said screw being of such length that said carriage is movable in said direction from a work-engaging position remote from said beam where said work is mounted in said mounting means in a setting to be welded over said length to a welding position where said work is in welding relationship with said beam.

8. Electron beam welding apparatus for welding work over a substantial length extending in a predetermined direction, comprising a welding chamber, a work advancing chamber in communication with said welding chamber, means connected to said welding chamber for producing a concentrated electron beam having a focal point in said chamber, work-holding means for holding said work, and means connected to said holding means for moving said holding means back and forth through said advancing chamber between a work engaging position external to said welding chamber, where said work is set for welding of said length along said direction, and said chamber where said work is welded, said advancing chamber and said moving means cooperating to enable said work to be advanced progressively from said advancing chamber to said welding chamber as it is being welded.

9. Electron beam welding apparatus for welding work along joints in different planes of said work, comprising welding-chamber means, means connected to said chamber means for producing an electron beam for welding therein, means to be connected to said work for mounting said work with said joint in one of said planes in a position to be welded by said beam, means connected to said mounting means for reorienting said work so that a joint in another of said planes is in a position to be welded by said beam, and gauge means sealed vacuum tight through said chamber for setting said joint in said other plane in substantially the same position for welding as said joint in said one plane.

10. Electron beam welding apparatus for welding work along joints in different planes of said work, each of said joints extending over a substantial length of said work in a predetermined direction, comprising means for producing an electron beam for welding, means connected to said producing means for setting said work with a joint in one of said planes in welding position, means connected to said setting means for advancing said work along said beam with said joint in welding relationship with said last-named joint, and means connected to said setting means for reorienting said work to set said work with a joint in another of said planes in a position to be welded by said beam.

11. Electron beam welding apparatus for welding work along seams with said work in different attitudes comprising means for producing a concentrated electron beam having a focal point, work holding means for holding said work, and work positioning means adjacent to said beam, and means for connecting said positioning means to said holding means for precisely positioning said work relative to said focal point in welding relationship with said beam in said different attitudes.

References Cited in the file of this patent

UNITED STATES PATENTS

| | | |
|---|---|---|
| 1,354,266 | Plant | Sept. 28, 1920 |
| 2,778,926 | Schneider | Jan. 22, 1957 |
| 2,793,281 | Steigerwald | May 21, 1957 |
| 2,932,720 | Stohr | Apr. 12, 1960 |

OTHER REFERENCES

Reprint from February 23 and Mar. 9, 1959, issues American Machinist.

UNITED STATES PATENT OFFICE
CERTIFICATE OF CORRECTION

Patent No. 3,093,726            June 11, 1963

George Burton, Jr., et al.

It is hereby certified that error appears in the above numbered patent requiring correction and that the said Letters Patent should read as corrected below.

In the grant, lines 2 and 3, on sheet 1 of the drawings, and in the heading to the printed specification, lines 4 and 5, for "Richard L. Machett", each occurrence, read -- Richard L. Matchett --.

Signed and sealed this 21st day of April 1964.

(SEAL)
Attest:

ERNEST W. SWIDER
Attesting Officer

EDWARD J. BRENNER

Commissioner of Patents